United States Patent [19]
Good et al.

[11] Patent Number: 5,377,058
[45] Date of Patent: Dec. 27, 1994

[54] FLY HEIGHT SERVO CONTROL OF READ/WRITE HEAD SUSPENSION

[75] Inventors: Daniel L. Good; Jeffrey E. Mason; Hal H. Ottesen, all of Rochester, Minn.

[73] Assignee: International Business Machines Corporation, Armonk, N.Y.

[21] Appl. No.: 999,036

[22] Filed: Dec. 31, 1992

[51] Int. Cl.⁵ .............................. G11B 21/02
[52] U.S. Cl. ........................ 360/75; 360/109
[58] Field of Search ............. 360/75, 103, 53, 104, 360/109, 77.08

[56] References Cited

U.S. PATENT DOCUMENTS

| | | | |
|---|---|---|---|
| 4,146,911 | 3/1979 | Gyi et al. | 360/75 |
| 4,605,977 | 8/1986 | Matthews | 360/103 |
| 4,651,242 | 3/1987 | Hirano et al. | 360/103 |
| 4,669,004 | 5/1987 | Moon et al. | 360/75 |
| 4,777,544 | 10/1988 | Brown et al. | 360/75 |
| 4,931,887 | 6/1990 | Hedge et al. | 360/103 X |
| 5,079,652 | 1/1992 | Ishida et al. | 360/75 |
| 5,130,867 | 7/1992 | Ohashi | 360/75 |
| 5,168,413 | 12/1992 | Coker et al. | 360/75 |

FOREIGN PATENT DOCUMENTS 63-69075  3/1988  Japan ........................ 360/75
2263306  10/1990  Japan .

OTHER PUBLICATIONS

English Translation of JP #63-69075 to Mizuno, pp. 1-9 Mar. 29, 1988.
Gaudet et al "Head Flight Height Monitoring" *IBM Technical Disclosure Bulletin* vol. 11 No. 12 p. 1650 May 1969.

*Primary Examiner*—Aristotelis Psitos
*Assistant Examiner*—James J. Wilson
*Attorney, Agent, or Firm*—Homer L. Knearl; Matthew J. Bussan

[57] ABSTRACT

The fly height of read/write heads in multiple disk drives is dynamically adjusted to optimum fly height by a servo loop. The fly height is sensed in real time with a harmonic ratio fly height detector and compared to an optimum or reference fly height. The suspension system of each head is adjusted in accordance with the departure of the fly height of that head from the optimum fly height. The adjustment of the suspension system is accomplished by bonding a piezoelectric film to the flexible suspension arm carrying each head. The fly height is corrected for both radial and circumferential error as the head changes radial and circumferential position relative to the disk surface. The reference fly height, to which each head is moved by the servo loop, may be selectively changed in the fly height servo operation. This can be done to lift the heads away from the disk surface during track seek mode or disk drive sleep mode. The reference fly height can also be changed to lower the heads towards the disk surface during error recovery mode.

18 Claims, 3 Drawing Sheets

FLY HEIGHT SERVO CONTROL OF READ/WRITE HEAD SUSPENSION

CROSS REFERENCE TO RELATED APPLICATIONS

U.S. Pat. application Ser. No. 07/885,578, filed May 19, 1992, of Egbert et al, commonly assigned with this application, describes a method and a means for using a digital signal processor with a digital harmonic ratio fly height detector, both located in the disk drive, for the purpose of performing fly height tests including circumferential measurements along a recording track. Testing of fly height at the disk drive allows the system to maintain a history of head/disk clearance. This history may be used to predict disk file life time, or give early warning of the potential for head crashes on the disk surface. The teachings of this application are incorporated herein by reference.

BACKGROUND OF THE INVENTION

1. Field of the Invention:

This invention relates to rigid or hard disk drives that store information, or data, on rotating magnetic disks. More particularly, this invention relates to control of the flying height of a read/write magnetic head as a rotating magnetic disk spins under the head.

2. Description of Prior Art:

A significant limitation on data density in hard disk drives is the "spacing loss" which is the reduction in signal quality due to distance (fly height) between the read/write head and the magnetic recording surface of the disk. The shorter the fly height is, the higher the potential data density is.

U.S. Pat. No. 4,777,544 of Brown et al, commonly assigned with this application, describes a method and a means for measurement of head/disk spacing by use of a harmonic ratio fly height circuit. The '544 patent is directed essentially to measurement of average fly height along a track, and use of that information during the manufacture of the drive. There is no provision for measuring circumferential variations in fly height around a recording track.

Closed loop control of fly height in a single-disk drive having a rigid support for the read/write head is shown in Japan Pat. 02-263306, and U.S. Pat. No. 4,146,911. In U.S. Pat. No. 4,146,911, the head arm is moved relative to the surface of the disk to change the fly height. In Japan 02-263306, a piezoelectric block between the arm and the read/write head is excited to change the fly height. Neither patent shows a conventional multiple-disk arm assembly consisting of a rigid comb with suspension arm attached to the end of each comb blade, and a floating head-suspension attached to the end of each suspension arm. The fly height control structures in these two patents are not practical for hard disk drives with flexible suspension systems such that the head fly height depends on the flying characteristic of the head as well as the suspension system.

SUMMARY OF THE INVENTION

It is the object of this invention to provide fly height control of an aerodynamic head in a disk drive by providing real-time dynamic adjustment of the read/write head suspension system.

In accordance with this invention, this object is accomplished by sensing the fly height in real time with a harmonic ratio fly height detector, testing the fly height against a reference fly height, and adjusting the suspension system of the head in accordance with the departure of the fly height of that head from the reference fly height. The adjustment of the suspension system is accomplished by placing a transducer on the flexible suspension arm at the end of each tooth of the radial arm actuator comb. Preferably, the transducer is a piezoelectric film bonded to the suspension arm. When a voltage is applied to the film, the film bends and thereby bends the suspension arm toward the disk surface. This increases the spring force applied by the suspension system on the read/write head. The spring force pushes against the aerodynamic lift of the head, and the head flies closer to the disk surface. Thus, the fly height of the head is corrected by applying a voltage to the piezoelectric film bonded to the suspension arm.

Correcting the fly height to the reference fly height is done for both radial and circumferential fly height error as the head is moved radially and circumferentially relative to the disk surface. Radial correction of fly height is based on a profile of the average fly height for each head during one or more disk revolutions at each cylinder or radial position. During a calibrate mode of operation for the disk drive, the average fly height for each head at selected cylinder positions is read and used to generate an approximation of the radial fly height profile for that head as a function of cylinder position. This radial fly height profile is stored in a profile storage control. Thereafter, during track seek, the average fly height for each head at the new cylinder position is retrieved from profile storage. The difference between the average fly height and the reference fly height for optimum read/write operation is taken, and provides the radial fly height error correction.

The circumferential fly height error correction is accomplished dynamically in the servo loop by feeding back the fly height error as the disk rotates. The actual fly height, as each head flies along a track, is measured and compared to the reference fly height that is optimum for read/write, or track follow operations. The difference between actual and optimum fly height is the circumferential error correction. The radial correction is added to the circumferential fly height error correction to produce the total, or combined, fly height error correction.

The reference fly height may be set to other values besides the optimum fly height for read/write or track follow. The reference fly height is decreased during error recovery of recorded data so that the servo loop flies the head closer to the disk surface. This improves the signal-to-noise ratio of the data signal read by the head.

The reference fly height may be increased so that the servo operation flies the head farther from the disk surface. The fly height is increased during track seek, disk drive sleep or idle modes of operation. As the head moves away from the disk surface, the real time fly height measurement may not be available if the head/disk separation becomes too great. Accordingly, as an alternative in seek, sleep or idle mode, the servo is operated open-loop by substituting a seek, or sleep, mode profile correction value for the circumferential and radial fly height error correction values.

The great advantage of the invention is its ability to accomplish the above functions by real time control of the suspension arm. Further, by adjusting the flexible suspension for the head, the system responds quickly without changing the flying characteristics of the head attached at the end of the suspension. Also, the head/-disk wear in the disk drive is substantially reduced by raising the head fly height during track seek, sleep and idle modes.

Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 1:
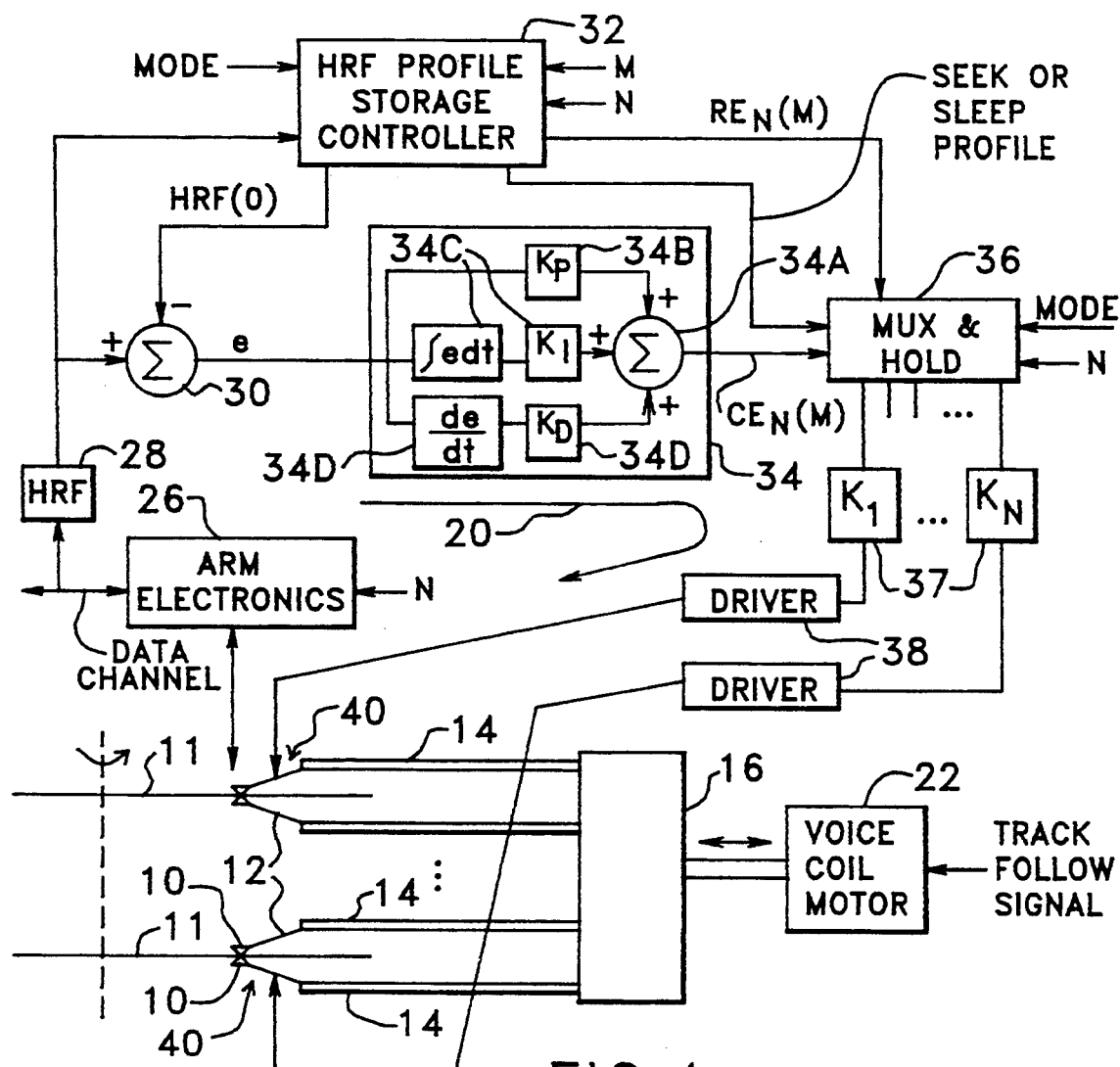
FIG. 1 shows the preferred embodiment of the fly height servo loop driving a transducer on the read/write head suspension.

The preferred embodiment of the invention for the fly height servo loop is shown in the schematic block diagram in FIG. 1. Magnetic heads 10 are mounted on flexible suspension arms 12 which are, in turn, mounted on the rigid arms 14 attached to the actuator 16. Suspension arms 12 may be flexed by control signals from drivers 18 in fly height control loop 20. Arms 14 and actuator 16 are moved by driver and voice coil motor 22 to move the heads radially to follow recorded tracks on the recording disks 11. The track following servo loop is not part of the present invention, and only the track follow signal from such a servo loop is shown in FIG. 1.

Figure 5:
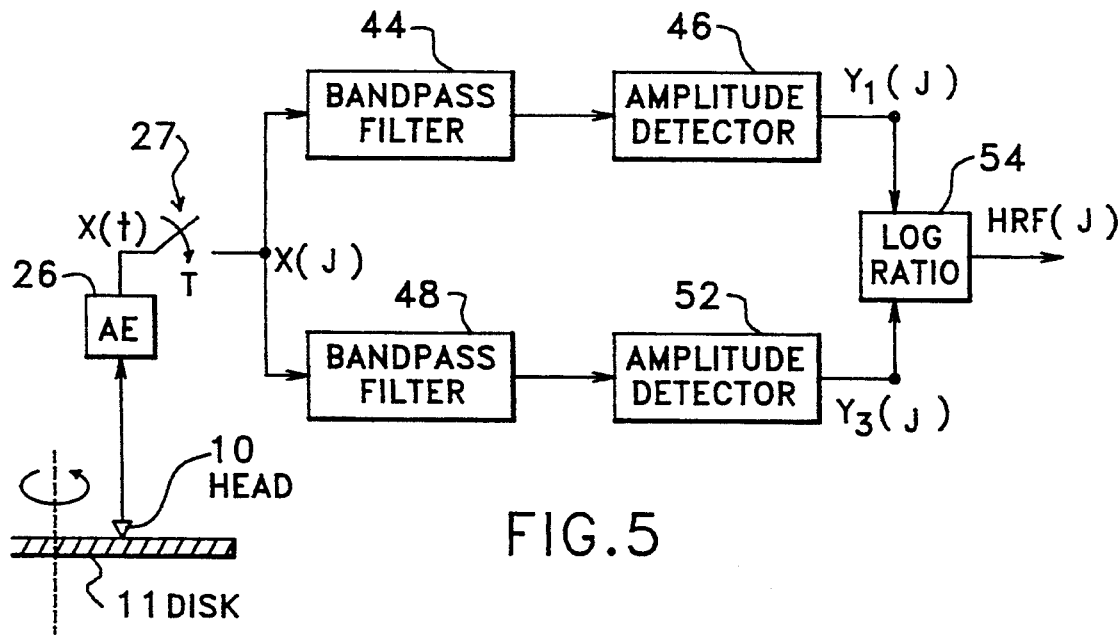
FIG. 5 is a schematic block diagram of the HRF circuit of FIG. 1.

Information and servo signals read by the heads 10 are amplified, and connected to the disk drive data channel by arm electronics 26. Since there is only one data channel and multiple heads, the arm electronics, in response to read/write head number "N", select the active head for connection to the amplifying circuits and data channel. The information and servo signals are passed over the channel to the read data signal processing circuits (not shown). The read signal for the fly height servo is picked off the data channel, and sampled by digitizing switching circuit in Harmonic Ratio Fly height detector (HRF) 28. HRF 28 measures the height read/write head 10 is flying above the surface of disk 11. The HRF circuit 28 is shown in FIG. 5 and will be described hereinafter.

The fly height measurements are passed to the summing circuit 30, and the HRF profile storage controller 32. Summing circuit 30 takes the difference between the real time fly height measurement from HRF 28 and the reference fly height, HRF(O). The digitized difference, or error signal "e" from summing circuit 30, is the circumferential error value used by the fly height servo loop 20 to control the fly height of each head 10 to bring it to the desired fly height HRF(O).

In operation, the fly height servo loop is correcting for both a radial variation in fly height (i.e., the variation from track to track), and a circumferential variation in fly height (i.e., the variation along each track). The circumferential correction is done in real time as a normal feedback operation through proportional, integral, derivative control 34. The radial correction is done by feeding forward a correction from profile storage controller 32 during track seek operations.

The HRF profile storage controller 32 in FIG. 1 functions to provide to multiplex switch (MUX) and hold circuit 36 the radial correction value, $RE_N(M)$, for each head N at each cylinder position M. Controller 32 also provides the reference fly height HRF(O) to which servo loop 20 drives the head. The Mode, M and N, commands are supplied to the controller 32 by the disk drive adapter or controller (not shown) to which the disk drive is attached.

Controller 32 operates in multiple modes—calibrate, read/write and track follow, track seek, error recovery, and sleep or idle. In calibrate mode, a radial correction value for each head at each cylinder position is determined. Calibrate may be performed during manufacture, installation or diagnostic testing of the drive. The error profile for each head, as it moves radially across the disk surface, will change very slowly over the life of the drive and, therefore, the calibrate mode will be used infrequently. The read/write, or track follow mode is used to accomplish closed loop radial and circumferential correction of fly height. In read/write or track follow mode, HRF(O) is set to a predetermined optimal fly height to maximize the data read/write performance of the disk drive. The remaining modes are used to change the fly height reference HRF(O) from optimal read/write fly height. HRF(O) is selectable by HRF controller 32 based on the Mode command. In track seek, sleep or idle mode, HRF(O) is increased relative to read/write mode to fly the head farther from the disk surface. In error recovery mode, HRF(O) is decreased relative to read write mode to fly the head closer to the disk surface. The details of the HRF profile storage controller are described hereinafter with reference to FIG. 6.

In FIG. 1, the digitized circumferential error value "e" from the summing circuit 30 is amplified by proportional, integral, derivative (PID) control 34. PID control in servo loops is well known. The PID control is preferably implemented as a programmed digital signal processor. FIG. 1 illustrates the equivalent analog amplification functions performed by such a digital signal processor. The proportional, integral and derivative amplified values are summed by summing circuit 34A. Amplifier 34B amplifies the error signal with a gain $K_P$ to produce a correction signal directly proportional to the error signal. Amplifier 34C integrates the error signal, and amplifies the integral of the error signal with a gain $K_I$. Amplifier 34D takes the derivative of the error signal and amplifies the derivative value with a gain $K_D$. The gain constants $K_P$, $K_I$ and $K_D$ are set, at time of manufacture of the drive, to optimize the response of the servo loop 20.

The PID amplified circumferential error correction value $CE_N(M)$ is applied to multiplexing switch (MUX) and hold 36. MUX and hold 36 also receives the radial correction value from the profile storage controller 32. The radial correction value is stored in hold registers in MUX and hold 36. In response to N, the number of the selected head, MUX and hold 36 adds the radial correction value for the selected head to the circumferential correction value for the selected head. The combined fly height error value is converted to an analog error signal, and switched by MUX 36 to the appropriate driver 38 for the selected read/write head. The selected driver drives the fly height adjustment by flexing the suspension arm 12 of the head whose signal was selected by N, the head number, in arm electronics 26.

Each of the servo loops for a given selected head and selected driver has a amplifier 37 with a associated gain constant $K_{1...N}$. These gain constants $K_{1...N}$ adjust the strength of the correction signal applied to drivers 38. This adjustment corrects for fixed differences in the servo loops due to variations in the electronics or mechanics of elements in the servo loops. The constants $K_{1...N}$ are set at the time of manufacture of the disk drive so that the servo loop for each head will perform substantially the same as the servo loops for the other heads.

Figure 2:
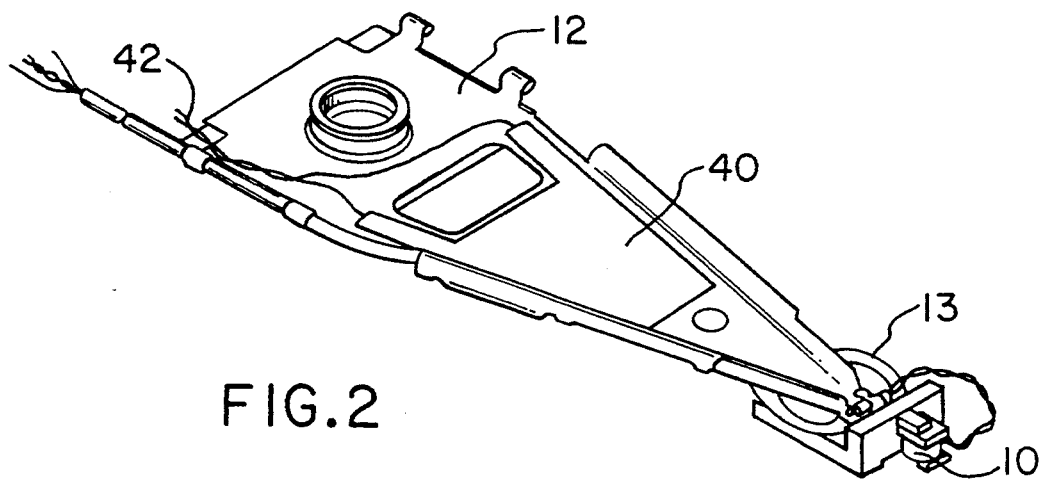
FIG. 2 shows the suspension system for the read/write head with the fly height transducer bonded to the suspension.

The suspension arm 12, with the floating suspension 13 and read/write head 10, are shown in FIG. 2. The fly height of the head is determined by the flying characteristics of the head; i.e., the lift force produced by the head aerodynamics, and by the spring force with which the suspension arm pushes the head toward the disk surface. Piezoelectric film 40 is bonded to arm 12. The fly height correction voltage is applied to the film from driver 38 through electrical wires 42. When the correction signal is applied to film 40, the film bends and thereby bends the suspension arm 12 bonded to the film.

The bending of the suspension arm toward the disk surface increases the spring force pushing against the aerodynamic lift of the read/write head. The head flies closer to the disk surface, and thus the fly height is adjusted by the correction signal applied to film 40. When less voltage is applied to the film, the suspension arm 12 is bent less, the spring force on the head decreases, and the head rises or flies higher above the disk surface. If fly height correction voltage is removed, i.e., reduced to zero, the minimum spring force is applied to the head, and the head flies at its highest fly height. This might occur in a low-power inactive state for the disk drive.

While a piezoelectric film is the preferred transducer for bending the suspension arm, other transducers may be used. For example, a bi-metallic strip that flexes in response to the amplified fly height error signal might be attached to the suspension arm.

Figure 3:
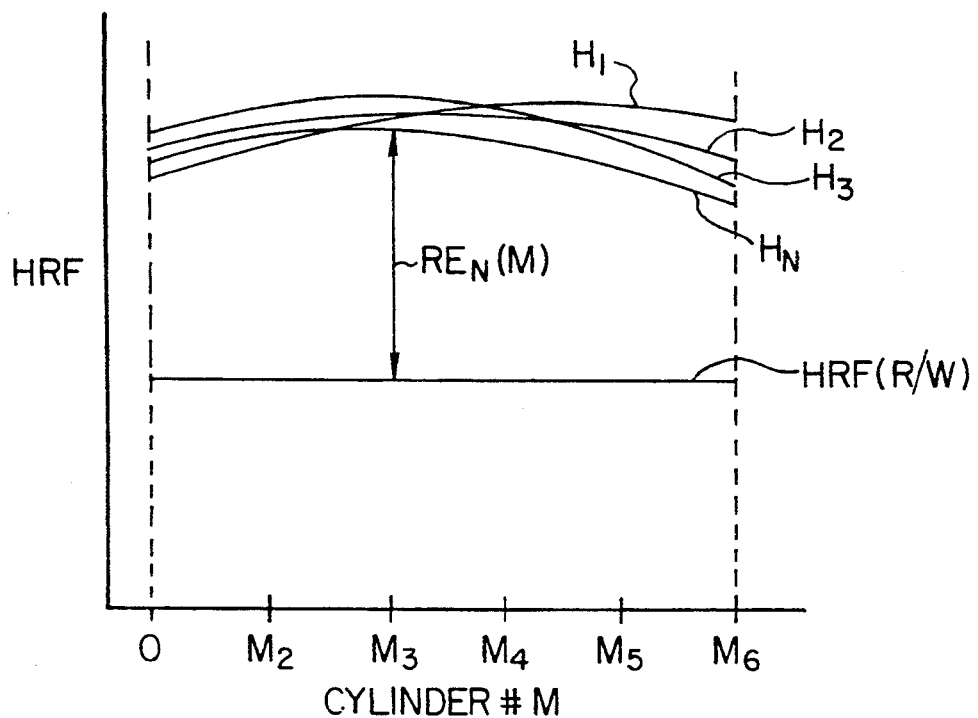
FIG. 3 is a graph of typical open-loop, head fly height profiles as a function of disk drive cylinder (radial position).

In FIG. 3, examples of radial HRF profiles for the read/write heads are shown. During a calibration mode, the HRF profile storage controller 32 (FIG. 1) receives the HRF signal for each head as the heads are moved radially across the disks 11. The HRF signal for each head at each of six cylinder positions ($M_1$, $M_2$, . . . $M_6$), for example, is averaged over several complete revolutions of disk 11. The average HRF per track is the radial HRF value for that head N at that cylinder position M as plotted in the profiles in FIG. 3. As shown in FIG. 3, the open-loop HRF profile for each head is approximately a parabolic curve. A radial profile value could be stored at each cylinder position M for each head N. However, since the profiles can be approximated by parabolic curves, each profile can be converted to a quadratic expression, $C_{1,N}M^2 + C_{2,N}M + C_{3,N}$. The constants C for each profile may be determined by the least squares error approximation method. Then the constants may be stored for each profile rather than an HRF value for each cylinder M. It will be appreciated by one skilled in the art that if the profile has a more complex shape, the profile could be approximated by a higher order expression rather than the second order expression used in the preferred embodiment.

Figure 6:
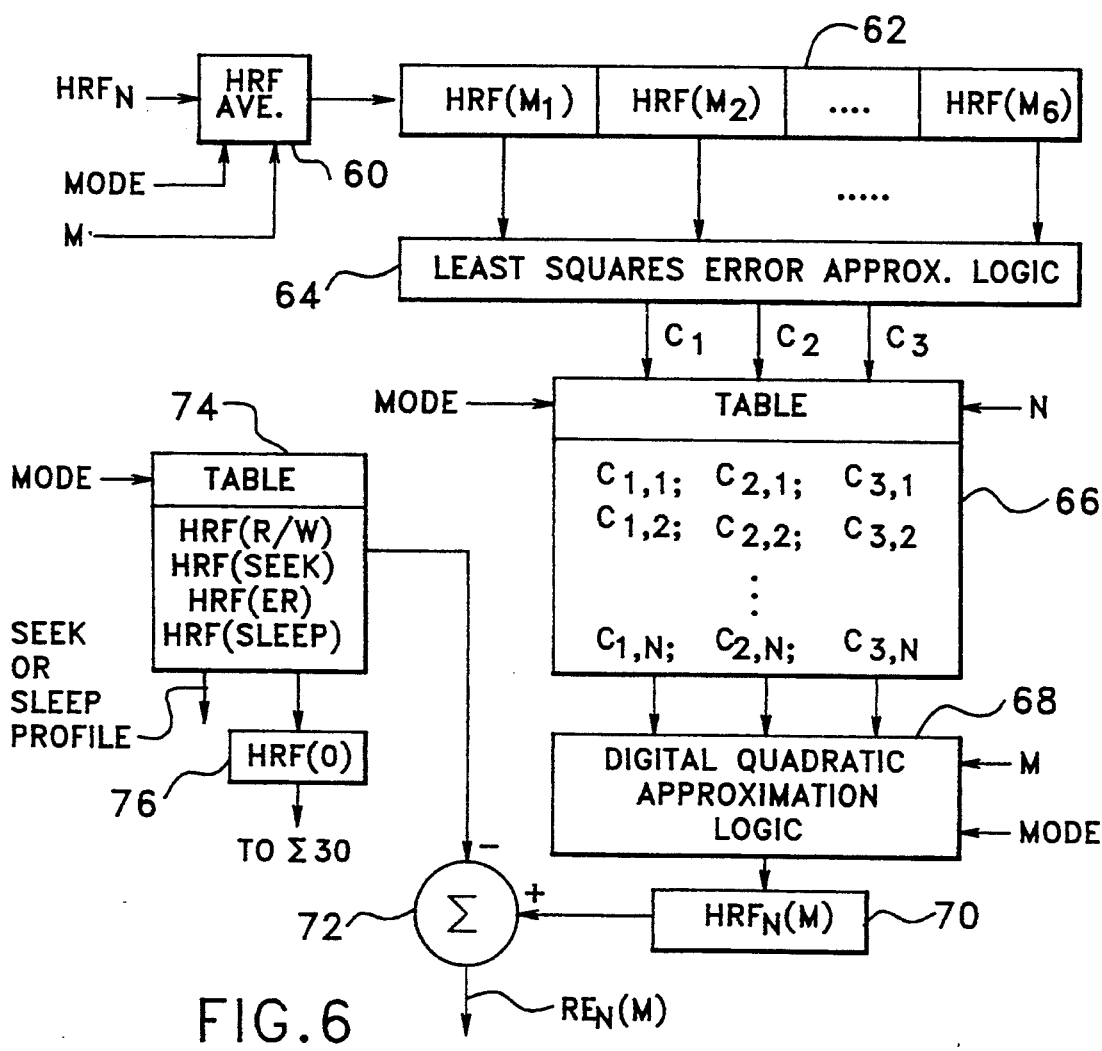
FIG. 6 is a schematic block diagram of one embodiment for the profile storage control of FIG. 1.

In FIG. 6, the HRF profile storage controller 32 has HRF value averaging logic 60. The averaging logic is active in calibrate mode to average the HRF value for a head N at each of six predetermined cylinder positions, $M_1$ through $M_6$, in the example shown in FIG. 3. Positions $M_1$ and $M_6$ are at the inner and outer most cylinders, the remaining four cylinder positions are equally distributed along the radius of the disks. For each head, the HRF average for the six cylinder positions is loaded into register 62. Least squares error approximation logic 64 then calculates the constants $C_1$, $C_2$ and $C_3$ that may be used in a quadratic expression to approximate the head profile for each head. In Table 66, calibrate mode selects a register location for the constants C for each head N. For example, for head #1, the table receives from logic 64, and stores constants $C_{1,1}$; $C_{2,1}$; $C_{3,1}$. Calibrate mode continues until constants C are loaded in table register 66 for all of the heads.

During track seek mode, the constants C in table 66 are used to approximate the HRF average measurement for each head at the new track; i.e., cylinder position. As the heads are being moved to the new cylinder position, digital quadratic approximation logic 68 receives the constants C for the each head and M the cylinder position. Logic 68 calculates the HRF average $HRF_N(M)$ for head N at cylinder M as the heads change radial position across the disks.

For example, assume the heads are at cylinder position 541 and the HRF average for head #3 is being determined. Table register 66, in response to a track seek mode command from the host processor and N=3 from the host processor, would read out constants, $C_{1,3}$, $C_{2,3}$ and $C_{3,3}$ to logic 68. Logic 68 receives M=541 from the host processor and calculates from the quadratic expression using the constants from register 66, the $HRF_3(541)$ average; i.e., the HRF average for head #3 at cylinder 541.

The $HRF_N(M)$ average for each head at each cylinder position is loaded into register 70. Summing circuit 72 then subtracts the optimal HRF reference value HRF(R/W) for read/write from $HRF_N(M)$. The difference is the radial error or correction value $RE_N(M)$ for head N at the cylinder position M. The optimal light height for read/write operations (or track follow) is stored in table register 74. During track seek, table register 74 reads out to HRF(O) register 76 the value HRF(SEEK) and to summing circuit 72 the value HRF(R/W).

In FIG. 1, MUX and hold 36 receives the $RE_N(M)$ for each head, and stores it as the radial error value in hold register for each head. This value is updated as the heads move through the cylinder positions. During track seek operations, MUX and hold 36 will add the radial error $RE_N(M)$ to the circumferential error $CE_N(M)$ being received from PID control 34. Since HRF(O) in track seek mode has the HRF(Seek) value (FIG. 4 described hereinafter), the resulting combined error signal will be used by drivers 38 to bring each head to the track seek fly height which is well above the read/write fly height HRF(R/W). Subsequently, during read/write or track follow operations at the new cylinder position, HRF(O) has the value HRF(R/W). MUX and hold 36 will add the radial error to the real time circumferential error being received from PID control 34. The resulting combined fly height error signal will be used by drivers 38 to bring each head to the optimal fly height HRF(R/W), as shown in FIG. 3.

Figure 4:
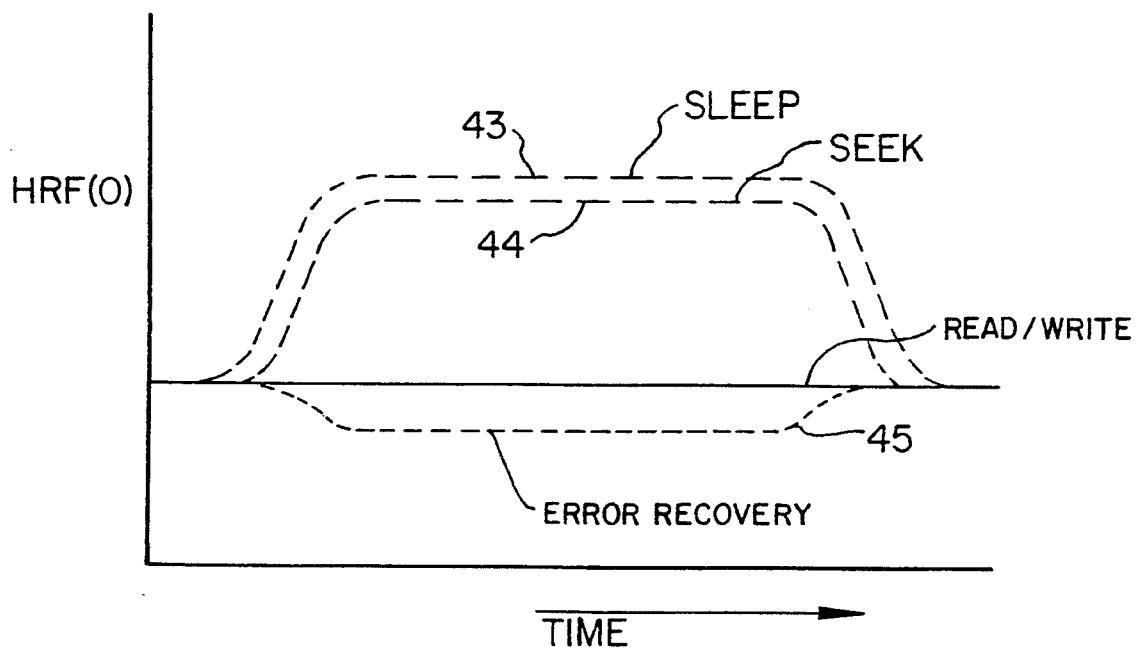
FIG. 4 is a graph of alternative optimum fly heights during track seek and error recovery.

The value of HRF(O), the reference fly height, at summing circuit 30 may be changed by HRF controller 32 to accomplish additional tasks with the fly height servo loop, as described above, for track seek. In FIG. 4, the value of HRF(O) may be increased, to a value 44, during a track seek mode. This has the effect of lifting the head further away from the disk surface during high speed radial movement of the heads. Conversely, the value of HRF(O) may be decreased to value 45 during an error recovery operation. This has the effect of lowering the head closer to the disk surface so as to improve the signal-to-noise ratio for the data signal read during reread of recorded data for error recovery. Also, during sleep or idle mode when the drive is not active, the value of HRF(O) may be increased to value 43 to lift the heads well clear of the disk surface to reduce head/disk wear. Sleep or idle modes are similar in that they are initiated by no disk drive activity over a predefined time interval, but they differ from each other in that in sleep mode, power to the disk drive is usually reduced while in idle mode, the power to the drive remains on.

The above operations use the closed servo loop 20 to raise and lower the fly height of the head. In addition, there are open-loop alternatives that may be used, or are even necessary, when raising the fly height of the head. As the fly height increases, the head/disk separation may make the data read signal unusable by HRF circuits 28 in FIG. 1. Therefore, an alternative embodiment for track seek mode and for sleep mode is to use the track seek profile 44 or disk drive sleep profile 43 (FIG. 4) to control drivers 38 (FIG. 1). In this embodiment, MUX and hold 36 deactivates the switching of the combined radial error $RE_N(M)$ and circumferential error $CE_N(M)$ to drivers 38 and instead switches the Seek or Sleep Profile received from profile storage controller 32. The Seek or Sleep Profiles shown in FIG. 4 would be stored in Table 74 (FIG. 6), and read out to MUX and hold 36. As shown in FIG. 4, the profiles lift the head away from the optimum read/write fly height, and gradually return the heads to read write fly height when seek or sleep has completed.

An additional low power alternative during sleep mode would be to shut off the servo loop and thus drive to the piezoelectric film 40. This would allow the natural spring tension of the suspension arm 12 to relax, and the aerodynamic lift of the heads would fly the heads at the sleep height shown in FIG. 4. This low power mode, or alternative implementation of sleep mode, is particularly useful in battery-driven computing systems, such as laptop or notebook computers.

FIG. 5 shows the harmonic ratio fly height detector 28 of FIG. 1. (The harmonic ratio fly height detector is also described in the above-identified Egbert et al patent application.) When read head 10 reads the synchronizing field at the beginning of each sector on the track on disk 11, sampling switch circuit 27 samples and digitizes the output X(t) of the arm electronics 26 at a rate (1/T) where T is the sampling period. The digitized sampled read signal X(J) where J is the sampling index, is passed to digital bandpass filters 46 and 48. The sampling rate, or frequency, should be at least twice the frequency of the read signal from the synchronizing field. Digital bandpass filters 46 and 48 filter out the first and third harmonic signal components of the sampled read signal, respectively. The outputs of the bandpass filters 46 and 48 are passed respectively to amplitude detectors 50 and 52. The amplitude detectors average the outputs of the filters to produce the instantaneous amplitude values which are the running averages for amplitudes of the first and third harmonics, respectively, $Y_1(J)$ and $Y_3(J)$. The running average values, $Y_1(J)$ and $Y_3(J)$, are applied to the logarithmic ratio circuit 54. The log ratio output of circuit 54, denoted as HRF(J), is proportional to the head/disk separation (flying height).

Since there are a small number of consecutive samples over a small physical space from which the read signal X(t) is read, the value HRF(J) can be associated directly with a location on the track. Accordingly, the HRF signal provides a direct measurement in real time of fly height of the head over the surface of the disk.

Those skilled in the art will appreciate that the components illustrated in FIG. 5 may be implemented by using well known digital signal processing means either in the digital read channel or as an invokable process in a digital filter program stored in the disk drive controller. Likewise, the HRF profile storage controller in FIG. 6 could be implemented with a programmed digital signal processor chip with its own ROM and RAM. Further, the bandpass filter and the amplitude detector could be implemented as described in U.S. Pat. No. application Ser. No. 67/999,047 filed Dec. 31, 1992, entitled "Digital Amplitude Estimator", by H. H. Ottesen et al. This application is incorporated herein by reference.

While a number of preferred embodiments of the invention have been shown and described, it will be appreciated by one skilled in the art, that a number of further variations or modifications may be made without departing from the spirit and scope of our invention.

What is claimed is:

1. In a disk drive having a read/write head, that aerodynamically flies above the recording disk surface, and an actuator arm for moving a read/write head from recording track to recording track on a recording disk surface, apparatus for dynamically controlling the fly height of each head above the disk surface while the head is flying along a data track reading a signal recorded at the data track, said apparatus comprising:

suspension means connected between the arm and the head for flexibly suspending the head above the disk surface and pushing on the head with a spring force against the aerodynamic lift force of the head;

said head reading the recorded signal in the data track and providing a read signal;

means for detecting from the read signal a current fly height of the head above the disk surface at the same time and location where said head is reading the recorded signal;

means for comparing the current fly height of the head to a reference fly height and generating a fly height error signal indicative of the difference between the current fly height and the reference fly height; and means responsive to the fly height error signal for controlling the spring force provided by said flexible suspension means to adjust the fly height of the head to the reference fly height at the same time and location where the head is reading the recorded signal and flying along the track.

2. The apparatus of claim 1 and in addition:

means for detecting the average fly height for the head at each track for one or more revolutions of the disk 3. The apparatus of claim 2 wherein said comparing means comprises:
means for comparing the average fly height to the reference fly height and generating a radial error signal for the head at each track position;
means for comparing the current fly height for each head to the reference fly height and generating a circumferential error signal; and
means for combining the radial and circumferential error signals to generate the fly height error signal.

4. The apparatus of claim 3 wherein said controlling means comprises:
transducing means on said suspension means for bending said suspension means in response to the fly height error signal.

5. The apparatus of claim 4 wherein said transducing means is a piezoelectric film bonded to said suspension means.

6. The apparatus of claim 1 and in addition:
means for changing the reference fly height to a higher value for track seek than for read/write operations by the disk drive and to a lower value for error recovery when re-reading recorded data than for read/write operations by the disk drive.

7. Fly-height servo-loop apparatus in a disk drive for controlling the fly height of a read/write head as the head flies aerodynamically above a data track on the surface of a recording disk, said data track having a plurality of sectors and said head moved between data tracks by an actuator arm, said apparatus comprising:
suspension means connected between said head and said actuator arm for flexibly suspending the head above the surface of the disk, said suspension means providing a spring force that acts against the aerodynamic lift force of the head as the head flies along the track;
said head for or reading a sector signal recorded in at least a portion of each sector of the data track.;
means responsive to the sector signal read by said head for measuring the actual fly height of the head at a sector location on the data track where said head is reading the sector signal as the head flies along the track on the disk surface;
means for calculating the difference between a predetermined reference fly height and the actual fly height to produce a fly height error signal; and
means responsive to said calculating means for bending said suspension means to adjust the spring force of the suspension on the head until the fly height error signal is reduced to zero whereby the head is controlled to fly at the reference fly height while the sector signal is read and the actual fly height is measured.

8. The apparatus of claim 7 wherein said measuring means comprises:
means for detecting the amplitude of a first harmonic of a signal read by the read/write head;
means for detecting the amplitude of a third harmonic of a signal read by the read/write head; and
means for taking the log ratio of the first and third harmonics, said ratio varying directly with the actual fly height of the head above the disk surface.

9. The apparatus of claim 7 wherein said calculating means comprises:
first calculating means for calculating the difference between the reference fly height and the average fly height of the head at each track position for one revolution of the disk and providing a radial fly height error signal;
second calculating means for calculating the difference between the reference fly height and the current fly height of the head as the head flies above recording disk on the currently active read/write track and providing a circumferential fly height error signal; and
means for combining the radial and circumferential error signals into the fly height error signal.

10. The apparatus of claim 9 wherein said first calculating means comprises:
profile storage means responsive to said measuring means for storing profile constants indicative of the profile of the average fly height of the head at each track position;
means responsive to the stored profile constants for each track for generating the average fly height of the head at each track; and
means for subtracting the reference fly height from the average fly height of the head.

11. The apparatus of claim 7 and in addition:
table means for storing multiple reference fly heights; and
said table means responsive to a mode signal for selecting one of the reference fly heights for use by said summing means.

12. The apparatus of claim 11 wherein said table means stores a reference fly height for read/write or track follow, for track seek, for disk drive sleep, and for error recovery.

13. The apparatus of claim 12 wherein:
said table means selects the track seek fly height as the reference fly height; and
said bending means decreases the spring force applied to the head by said suspension means so that the head flies high above the disk surface during track seek operation of the disk drive.

14. The apparatus of claim 12 wherein:
said table means selects the error recovery fly height as the reference fly height; and
said bending means increases the spring force applied to the head by said suspension means so that the head flies low above the disk surface during error recovery operation of the disk drive.

15. The apparatus of claim 7 and in addition:
table means for storing multiple fly height profiles for the head; and
said table means responsive to a mode signal for selecting one of the fly height profiles for used by said bending means.

16. The apparatus of claim 15 wherein said table means stores a fly height profile for track seek and for disk drive sleep.

17. The apparatus of claim 16 wherein:
said bending means, responsive to the selected profile from said table means, decreases the spring force applied to the head by said suspension means so that the head flies high above the disk surface during track seek or disk drive sleep mode.

18. The apparatus of claim 7 and in addition:
means responsive to a track seek mode or disk drive sleep mode for blocking the passage of the fly height error signal from said summing means to said bending means; and
said bending means, in the absence of the fly height error signal, decreases the spring force applied to the head by said suspension means so that the head flies high above the disk surface during track seek or disk drive sleep mode.

* * * * *